United States Patent [19]

Zingg

[11] Patent Number: 5,540,103
[45] Date of Patent: Jul. 30, 1996

[54] ELECTROMAGNETIC FLOW SENSOR

[75] Inventor: Thomas Zingg, Basel, Switzerland

[73] Assignee: Endress+Hauser Flowtec AG, Switzerland

[21] Appl. No.: 315,813

[22] Filed: Sep. 30, 1994

[30] Foreign Application Priority Data

Oct. 14, 1993 [EP] European Pat. Off. .............. 93810721
Aug. 4, 1994 [EP] European Pat. Off. .............. 94112235

[51] Int. Cl.$^6$ ........................................... G01L 1/00
[52] U.S. Cl. ........................................ 73/861.12; 73/861.11
[58] Field of Search ........................... 73/861.12, 861.13, 73/861.14, 861.15, 861.16, 861.17

[56] References Cited

U.S. PATENT DOCUMENTS

| | | | |
|---|---|---|---|
| 2,734,380 | 2/1956 | Mittlemann | 73/861.12 |
| 2,770,130 | 11/1956 | Romanowski et al. | 73/861.12 |
| 2,800,016 | 7/1957 | Sturgeon | 73/861.12 |
| 3,504,541 | 4/1970 | Birnstingl | 73/861.12 |
| 3,610,040 | 10/1971 | Wada | 73/861.12 |
| 4,098,118 | 7/1978 | Schmoock | 73/861.12 |
| 4,181,018 | 1/1980 | Schmoock | 73/861.12 |
| 4,214,477 | 7/1980 | Schmoock | 73/861.12 |
| 4,262,542 | 4/1981 | Freund et al. | 73/861.12 |
| 4,358,964 | 11/1982 | Otsuka | 73/861.12 |
| 4,470,309 | 9/1984 | Wada . | |
| 4,567,775 | 2/1986 | Schmoock | 73/861.12 |
| 4,614,121 | 9/1986 | Hansen et al. . | |
| 4,631,969 | 12/1986 | Schmoock | 73/861.12 |
| 4,641,536 | 2/1987 | Jacobsen et al. | 73/861.12 |
| 4,679,442 | 7/1987 | Kubota | 73/861.12 |
| 4,774,844 | 10/1988 | Davis . | |
| 4,932,268 | 6/1990 | Hafner | 73/861.12 |
| 5,125,276 | 6/1992 | Wada | 73/861.12 |

FOREIGN PATENT DOCUMENTS

| | | |
|---|---|---|
| 2040682 | 2/1972 | Germany . |
| 63-20018 | 2/1988 | Japan . |
| 1155216 | 6/1989 | Japan . |
| WO91/11731 | 8/1991 | WIPO . |

*Primary Examiner*—Hezron E. Williams
*Assistant Examiner*—Ronald L. Biegel
*Attorney, Agent, or Firm*—Barnes & Thornburg

[57] ABSTRACT

To minimize the material consumption for coils, their pole pieces, and the magnetic return path in electromagnetic flow sensors with reduced overall length and nominal diameters between 200 mm and 700 mm, a measuring tube is provided through which flows an electrically conductive fluid to be measured, and which has at least two measuring electrodes. At the measuring tube, means are provided for generating a magnetic field passing through the measuring tube which comprise: coils, coil cores, and pole stampings which are disposed diametrically opposite to each other on the outside surface of the measuring tube and extend on both sides of the respective coil in the circumferential direction, with their ends separated by a sufficient distance, and two magnetic return-path stampings each disposed on the outside surface of the measuring tube on one side of the coils and the pole stampings and completely surrounding the measuring tube and magnetically coupled via the coil cores to the pole stampings. The coils, coil cores, pole stampings, and return-path stampings are surrounded with an enclosure. For nominal diameters above 500 mm, two pairs of coil sections are provided.

21 Claims, 3 Drawing Sheets

ELECTROMAGNETIC FLOW SENSOR

FIELD OF THE INVENTION

The present invention relates to electromagnetic flow sensors comprising a measuring tube with a nominal diameter greater than 200 mm through which flows an electrically conductive fluid to be measured. For the purposes of the invention, the term "flow sensor" means the essentially mechanical portion of an electromagnetic flowmeter without the electrode voltage evaluation electronics and without the coil current generator circuit. As is well known, such electromagnetic flow sensors make use of Faraday's law of induction.

BACKGROUND OF THE INVENTION

U.S. Pat. No. 4,470,309 describes various embodiments of electromagnetic flow sensors comprising
a metallic measuring tube through which flows an electrically conductive fluid to be measured and whose inner surface is lined with an insulating layer,
which has at least two measuring electrodes, and
at which means are provided for generating a magnetic field passing through the measuring tube which comprise:
  coils disposed diametrically opposite to each other outside the outer surface of the measuring tube,
  coil cores, and
  pole pieces formed thereon which extend to or rest on the outer surface of the measuring tube, as well as
a magnetically shielded casing enclosing the coils and the coil cores with the pole pieces, which also serves to close the magnetic circuit, thus acting as a magnetic return path.

DE-B 20 40 682 describes an electromagnetic flow sensor comprising
a metallic measuring tube through which flows an electrically conductive fluid to be measured and whose inner surface is lined with an insulating layer,
  which has at least two measuring electrodes, and
  at which means are provided for generating a magnetic field passing through the measuring tube which comprise:
    saddle-shaped coils disposed diametrically opposite to each other outside the outer surface of the measuring tube, and
    stacked laminations completely surrounding the central portions of the saddle-shaped coils for closing the magnetic circuit, thus acting as a magnetic return path.

U.S. Pat. No. 4,774,844 describes an electromagnetic flow sensor comprising
a plastic measuring tube through which flows an electrically conductive fluid to be measured,
  which has at least two measuring electrodes,
  at which means are provided for generating a magnetic field passing through the measuring tube which comprise saddle-shaped coils with coil cores disposed diametrically opposite to each other on the outside surface of the measuring tube, and
a magnetically shielded casing which surrounds the saddle-shaped coils and coil cores and also serves to close the magnetic circuit, thus acting as a magnetic return path.

WO-A 91/11731 discloses an electromagnetic flow sensor comprising
a measuring tube of insulating material through which flows an electrically conductive fluid to be measured,
  which has at least two measuring electrodes,
  at which means are provided for generating a magnetic field passing through the measuring tube which comprise saddle-shaped coils with coil cores disposed diametrically to each other on the outside surface of the measuring tube and stacked laminations which are formed on the coils on both sides thereof, form respective air gaps in the areas of the measuring electrodes, end in pole pieces, and act as magnetic return paths,
  a compensating magnetic field being generated between said pole pieces in the area of the measuring electrodes which is directed oppositely to the magnetic field.

The manufacturing costs of such electromagnetic flow sensors increase disproportionately toward great nominal diameters, particularly above 200 mm up to 2000 mm, especially since, to achieve a sufficient magnetic field strength, the coils and the coil cores/pole pieces or the saddle-shaped coils/coil cores must be made correspondingly large, which requires large quantities of copper for the coils, particularly for the saddle-shaped coils, and correspondingly large quantities of material for the coil cores/pole pieces.

SUMMARY OF THE INVENTION

It is, therefore, an object of the invention to simplify the design of electromagnetic flow sensors with coils and coil cores/pole pieces so as to substantially reduce their manufacturing costs in the nominal-diameter range above 200 mm.

The first variant of the invention therefore consists in the provision of an electromagnetic flow sensor comprising
a nonferromagnetic metallic measuring tube through which flows an electrically conductive fluid to be measured and whose inside surface is lined with an insulating layer,
  whose nominal diameter is 200 mm to 700 mm,
  which has at least two measuring electrodes, and
  at which means are provided for generating a magnetic field passing through the metallic measuring tube which comprise:
    non-saddle-shaped coils disposed diametrically opposite to each other at the outside surface of the metallic measuring tube,
    coil cores,
    pole pieces of soft magnetic material which extend on both sides of the respective non-saddle-shaped coil in the circumferential direction either as pole stampings on the inside or outside surface of the metallic measuring tube or as pole regions put in the metallic measuring tube, with their ends separated by a sufficient distance,
    either two soft magnetic return-path stampings each disposed on one side of the coils and of the pole stampings or regions and resting on the outside or inside surface of the metallic measuring tube and completely surrounding the latter,
    or two soft magnetic return-path regions each put in and completely surrounding the metallic measuring tube on one side of the coils and of the pole stampings or regions,
      said return-path stampings or regions being respectively magnetically coupled via the coil cores to the pole stampings or regions, and
  an enclosure surrounding the coils and/or the coil cores and/or the pole stampings or regions and/or the return-path stampings or regions.

The second variant of the invention consists in the provision of an electromagnetic flow sensor comprising
a ceramic measuring tube or plastic measuring tube through which flows an electrically conductive fluid to be measured,
  whose nominal diameter is 200 mm to 700 mm,
  which has at least two measuring electrodes, and
  at which means are provided for generating a magnetic field passing through the ceramic measuring tube or plastic measuring tube which comprise:
    non-saddle-shaped coils disposed diametrically opposite to each other at the outside surface of the ceramic measuring tube or plastic measuring tube,
    coil cores,
    pole pieces of soft magnetic material which extend on both sides of the respective coil in the circumferential direction and
      either are embedded as pole regions in the plastic measuring tube
      or extend as pole stampings on the outside surface of the ceramic measuring tube or plastic measuring tube
      or extend as magnetically conductive pole regions of the measuring tube and whose ends are separated by a sufficient distance,
    either two soft magnetic return-path stampings each embedded in the plastic measuring tube or resting on the outside surface of the ceramic measuring tube or plastic measuring tube on one side of the coils and of the pole stampings or regions
    or two return-path regions each provided on one side of the coils and of the pole stampings or regions and forming a soft magnetic conductive section of the ceramic measuring tube or plastic measuring tube,
      said return-path stampings or regions being respectively magnetically coupled via the coil cores to the pole stampings or regions and completely surrounding the ceramic measuring tube or plastic measuring tube, and
an enclosure surrounding the coils and/or the coil cores and/or the pole stampings or regions and/or the return-path stampings or regions.

The third variant of the invention consists in the provision of an electromagnetic flow sensor comprising
a nonferromagnetic metallic measuring tube through which flows an electrically conductive fluid to be measured and whose inside surface is lined with an insulating layer,
  whose nominal diameter is greater than 500 mm,
  which has at least two measuring electrodes, and
  at which means are provided for generating a magnetic field passing through the metallic measuring tube which comprise:
    non-saddle-shaped pairs of coil sections disposed diametrically opposite to each other at the outside surface of the metallic measuring tube,
      whose respective axes are in line and extend parallel to the axis of the metallic measuring tube,
    one U-shaped coil core per coil section
      which has the respective coil section wound on its portion interconnecting its legs,
    pole pieces of soft magnetic material which extend on both sides of the respective pair of coil sections in the circumferential direction either as pole stampings on the outside or inside surface of the metallic measuring tube or as pole regions put in the metallic measuring tube, with their ends separated by a sufficient distance,
    either two soft magnetic return-path stampings each disposed on one side of the coils and the pole stamping or regions and resting on the outside or inside surface of the metallic measuring tube and completely surrounding the latter
    or two soft magnetic return-path regions each put in the metallic measuring tube on one side of the pairs of coil sections and of the pole stampings or regions and completely surrounding the metallic measuring tube,
      said return-path stampings or regions being respectively magnetically coupled via the coil cores to the pole stampings or regions such that
        the respective core legs facing toward each other are magnetically coupled to the pole stampings or regions, and the respective core legs facing away from each other are magnetically coupled to the return-path stampings or regions, and
an enclosure surrounding the coils and/or the coil cores and/or the pole stampings or regions and/or the return-path stampings or regions.

The fourth variant of the invention consists in the provision of an electromagnetic flow sensor comprising
a ceramic measuring tube or plastic measuring tube through which flows an electrically conductive fluid to be measured,
  whose nominal diameter is greater than 500 mm,
  which has at least two measuring electrodes, and
  at which means are provided for generating a magnetic field passing through the ceramic measuring tube or plastic measuring tube which comprise:
    non-saddle-shaped pairs of coil sections disposed diametrically opposite to each other at the outside surface of the ceramic measuring tube or plastic measuring tube
      whose respective axes are in line and extend parallel to the axis of the ceramic measuring tube or plastic measuring tube,
    one U-shaped coil core per coil section
      which has the respective coil section wound on its portion interconnecting its legs,
    pole pieces of soft magnetic material on both sides of the respective pair of coil sections in the circumferential direction which
      either are embedded as pole regions in the plastic measuring tube
      or extend as pole stampings on the outside surface of the ceramic measuring tube or plastic measuring tube
      or extend as magnetically conductive pole regions of the measuring tube, and whose ends are separated by a sufficient distance,
    either two soft magnetic return-path stampings each embedded in the plastic measuring tube or resting on the outside surface of the ceramic measuring tube or plastic measuring tube on one side of the pair of coil sections and of the pole stampings or regions,
    or two return-path regions each provided on one side of the pair of coil sections and of the pole stampings or regions and forming a soft-magnetically conductive section of the ceramic measuring tube or plastic measuring tube,
      said return-path stampings or regions completely surrounding the ceramic measuring tube or plastic measuring tube and being respectively magnetically coupled via the coil cores to the pole stampings or regions such that the respective core legs facing toward each other are magnetically coupled to the pole stampings or regions, and the respective core legs facing away from each other to the return path stampings or regions, and an enclosure surrounding the coils and/or the coil cores and/or the pole stampings or regions and/or the return-path stampings or regions.

The electromagnetic flow sensors of the invention thus differ from the conventional electromagnetic flow sensors in having, inter alia, the following advantages:

The enclosure no longer serves as a magnetic return path but only has a mechanical protective function and, in the case of a metal casing, a magnetic shielding function;

pole pieces and magnetic return path are implemented with sheet stampings or stacked laminations resting on the outside surface of the measuring tube or with pole regions forming part of the measuring tube, so that the material consumption for pole pieces and magnetic return path depends only on the respective diameter of the measuring tube and is thus minimized;

the coils require only justifiably little copper, but very much less than the saddle-shaped coils of the prior art;

the magnetic system is very easy to assemble, and the extent of the magnetic field in the direction of the axis of the measuring tube is shorter than in the conventional arrangements, so that the measuring tube can also be made shorter than usual, whereby a further cost reduction is achieved since, in addition to copper, measuring-tube material can be saved. With saddle-shaped coils, the measuring-tube length must be at least 1.5 times the nominal diameter, while in the invention, only 1.3 times the nominal diameter is necessary.

In a preferred embodiment of the first or second variant of the invention, there are provided:

two coils whose respective axes are perpendicular to the axis of the measuring tube, and two U-shaped coil cores per coil whose leg length is little greater than the length of the coils, one leg of each of which extends into the respective coil and is magnetically coupled to the pole stampings or regions, with the legs in the respective coils separated by a given distance, and whose respective legs which are not in the respective coils are magnetically coupled to the return-path stampings or regions.

According to a further development of this embodiment of the first or second variant of the invention and in a preferred embodiment of the third or fourth variant, the two U-shaped coil cores belonging to a coil are united to form a single E-shaped coil core.

In another preferred embodiment of each of the four variants of the invention, the pole stampings are interrupted in the vicinity of the coils, and the ends thus formed are bent up and magnetically coupled to that leg of the respective coil core which is in the coil.

In a further preferred embodiment of the four variants of the invention, the return-path stampings are interrupted in the vicinity of the coils, and the ends thus formed are bent up and magnetically coupled to that leg of the respective coil core which is not in the coil.

In all four variants of the invention and the embodiments mentioned, the enclosure may be a metal casing, preferably a magnetically shielded casing.

BRIEF DESCRIPTION OF THE DRAWINGS

The invention will become more apparent from the following description of embodiments of the invention taken in conjunction with the accompanying schematic drawings, in which like parts are designated by like reference characters, and in which.

DETAILED DESCRIPTION OF THE DRAWINGS

Figure 1:
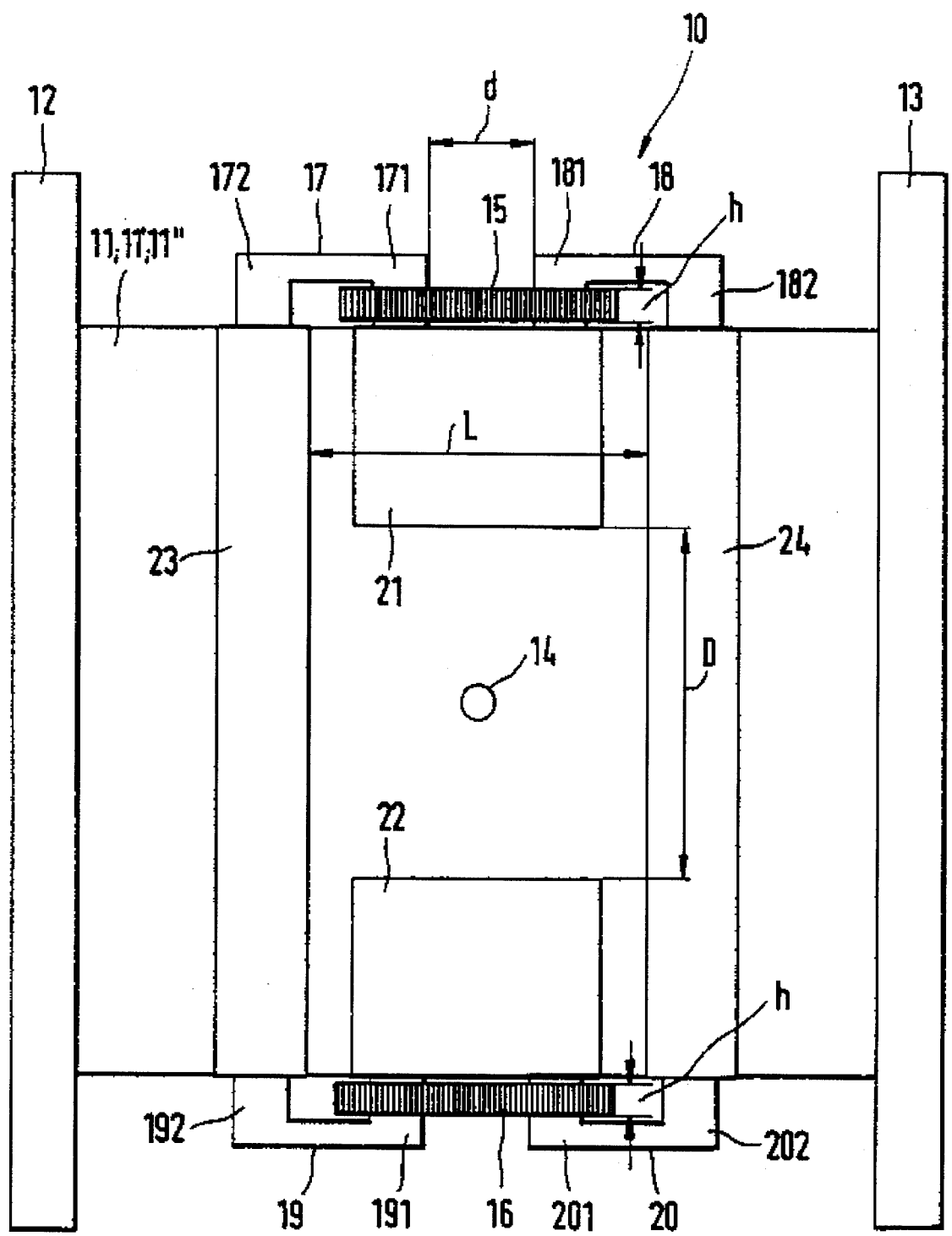
FIG. 1 is a side view of an electromagnetic flow sensor for nominal diameters between 200 mm and 700 mm with two coils of the magnetic system.

The electromagnetic flow sensor 10 shown schematically in FIG. 1, which is designed for the nominal-diameter range between 200 mm and 700 mm, particularly between 350 mm and 600 mm, has a measuring tube through which flows an electrically conductive fluid to be measured. The measuring tube may be made of a nonferromagnetic metal (metallic measuring tube 11), such as stainless steel, of a suitable ceramic (ceramic measuring tube 11'), such as alumina ceramic, or of a suitable plastic (plastic measuring tube 11"), such as hard rubber.

Figure 4A:
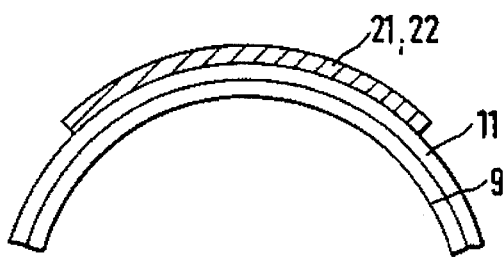
FIGS. 4a–4b is a schematic sectional view of the arrangement of pole stampings on the outside surface of the measuring tube.
Figure 5A:
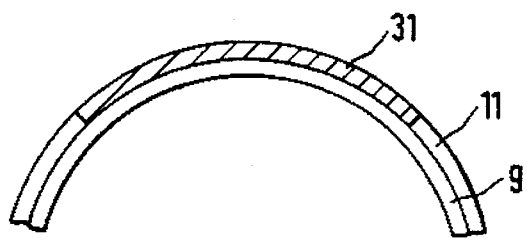
FIGS. 5a–5b are schematic sectional views of the arrangement of pole regions of the measuring tube.
Figure 6A:
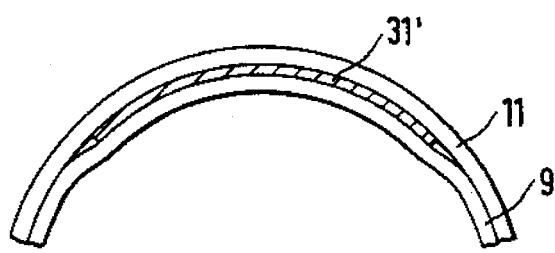
FIGS. 6a–6b are schematic sectional views of the arrangement of a pole stamping on the inside surface of a metallic measuring tube and of a pole stamping embedded in a plastic measuring tube.

If the measuring tube is a metallic measuring tube 11, its inside surface is lined with an insulation 9 of, e.g., polyfluoroethylene, particularly polytetrafluoroethylene, of soft rubber or of hard rubber, so that the signals induced by the magnetic field will not be short-circuited by the metallic measuring tube 11, see also FIGS. 4a, 5a, 6a.

In FIG. 1, the nonferromagnetic measuring tube 11 is provided with flanges 12, 13, via which the sensor 10 can be installed in a conduit (not shown) in a fluid-tight manner. Instead of the flanges, bolted or hose unions as are commonly used in the sanitary and food industries are possible. Also possible are flangeless connections through axial compression of conduit and measuring tube, particularly in the case of ceramic measuring tubes 11' or plastic measuring tubes 11".

Mounted in or on the wall of the measuring tube are, preferably two, measuring electrodes which are disposed diametrically opposite to each other, and of which only one, 14, is visible in FIG. 1. If the measuring electrodes are to be brought in contact with the fluid, i.e., if they are to be galvanic measuring electrodes, each of them is installed in a hole in the wall of the measuring tube; if the latter is a metallic measuring tube 11, the electrodes must be insulated from the tube. In the case of capacitive measuring electrodes, there is to be no contact with the fluid, and the measuring electrodes are therefore insulated from the fluid. Further measuring electrodes may be provided, as well as ground electrodes and monitoring electrodes, such as electrodes for monitoring the level of the fluid.

Furthermore, means are provided at the measuring tube for generating a magnetic field which passes through the measuring tube, preferably perpendicular to the electrode-connecting diameter and perpendicular to the axis of the measuring tube. These means comprise two non-saddle-shaped, i.e., flat, coils 15, 16, which are disposed diametrically opposite to each other as close as possible to the outside surface of the measuring tube 11, and two U-shaped coil cores 17, 18, 19, 20 per coil.

In the embodiment of FIG. 1, the respective axes of the coils 15, 16 extend perpendicular to the axis of the measuring tube, i.e., in the direction of a radius of the cross-sectional area of the measuring tube. The planes of the turns of each coil 15, 16 are therefore horizontal in FIG. 1 and extend perpendicular to the plane of the paper. The coils 15, 16 are preferably oblong and flat and rectangular in section.

The leg length of the coil cores 17, 18, 19, 20 is little greater than the length or height h of the coils 15, 16. One leg 171, 181 of each of the coil cores 17, 18 belonging to the coil 15 and one leg 191, 201 of each of the coil cores 19, 20 belonging to the coil 16 extend into the respective coil and are spaced a distance d apart. This distance d is preferably greater than 30 mm.

The means for generating the magnetic field passing through the measuring tube further comprise pole pieces in the form of pole stampings 21, 22 of soft magnetic material, which extend in FIG. 1 below and on both sides of the respective coil 15, 16 in the circumferential direction on the outer surface of the measuring tube, with their ends separated by a sufficient distance D, see also FIG. 4.

In FIG. 1, only the front portion of each of the pole stampings 21, 22 can be seen; their equally large rear portions are covered. The legs 171, 181 in coil 15 and the legs 191, 201 in coil 16 are magnetically coupled to the pole stampings 21 and 22, respectively.

The means for generating a magnetic field passing through the measuring tube further comprise two soft magnetic return-path stampings 23, 24 each disposed on one side of the coils 15, 16 and the pole stampings 21, 22 and resting, in FIG. 1, directly on the outer surface of the measuring tube, completely surrounding the latter.

Thus, these two return-path stampings are closed rings and are magnetically coupled via the coil cores 17, 19 and 18, 20 to the pole stampings 21 and 22, respectively. In FIG. 1, this coupling is provided by those legs of the coil cores 17, 19 and 18, 20 which are not in the respective coils 15 and 16, i.e., by the legs 172, 192 and 182, 202, respectively.

The distance L between the return-path stampings 23, 24 is preferably equal to between 0.3 times and 0.7 times, particularly between 0.4 times and 0.6 times, the nominal diameter.

Figure 2:
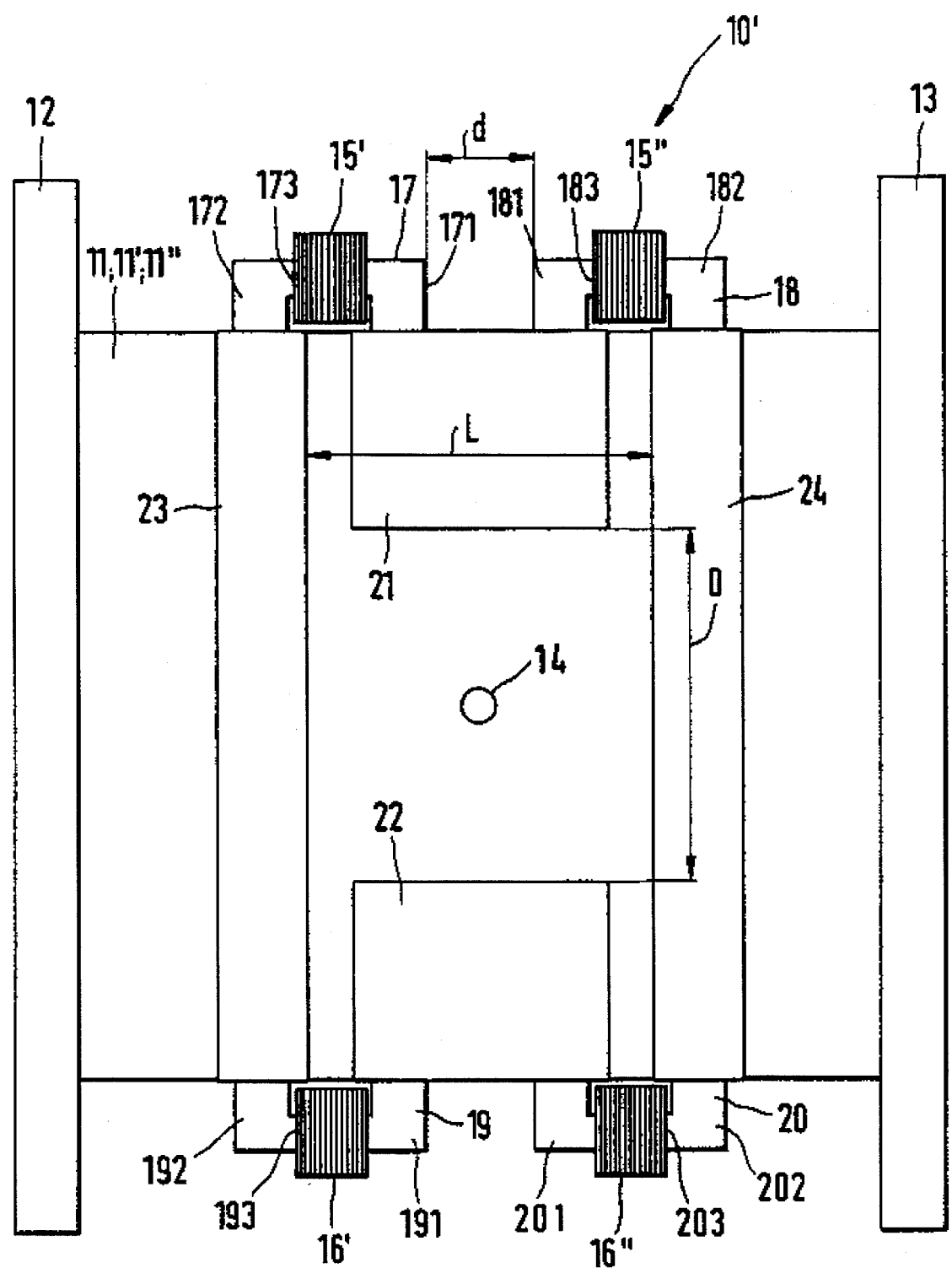
FIG. 2 is a side view of an electromagnetic flow sensor for nominal diameters greater than 500 mm with four coil sections of the magnetic system.

The electromagnetic flow sensor 10' of FIG. 2, which is designed for the nominal-diameter range above 500 mm, particularly above 700 mm, differs from the flow sensor of FIG. 1 only in the arrangement of the coils and coil cores, so that for the explanation of the other parts of FIG. 2, reference is made to the corresponding explanation of FIG. 1.

In FIG. 2, the respective coils comparable to the coils 15 and 16 of FIG. 1 each consist of a pair of coil sections 15', 15" and 16', 16" whose axes are in line. These axes extend parallel to the axis of the measuring tube. The coil sections are wound on the respective portions 173, 183, 193, 203 interconnecting the respective legs 171, 172, 181, 182, 191, 192, 201, 202 of the U-shaped coil cores 17, 18, 19, 20. The planes of the turns of each coil section are therefore vertical and extend perpendicular to the plane of the paper.

Here, the pole stampings 21 and 22 are magnetically coupled to the respective legs facing toward each other, 171, 181 and 191, 201, respectively, and the return-path stampings 23 and 24 are magnetically coupled to the respective legs facing away from each other, 172, 192 and 182, 202, respectively.

The direction of the magnetic field generated by the coil sections 17, 18 of the upper pair of coils in FIG. 2 is such that in one of the two alternately generated magnetic-field directions, for example, the magnetic field in the connecting portion 173 is directed toward the left and that in the connecting portion 183 toward the right. At the same time, the magnetic field in the connecting portion 193 of the coil section 19 is directed toward the right, and that in the connecting portion 203 of the coil section 20 toward the left. In the four connecting portions 173, 183, 193, 203, these magnetic-field directions can be achieved through the sense of winding of the coil sections and/or through the polarities of the coil sections of a pair.

Figure 3:
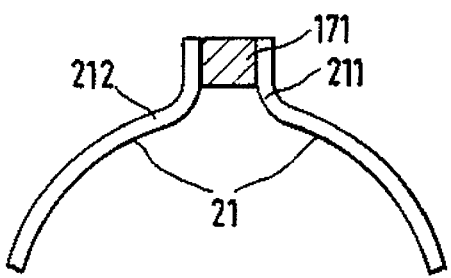
FIG. 3 is a schematic sectional view of one variant of the magnetic coupling between pole stampings and coil cores.

FIG. 3 illustrates, by the example of a pole stamping 21 extending on the outside surface of the measuring tube, that the pole stampings may be interrupted in the vicinity of the coils and that the ends 211, 212 formed thereby may be bent up. These ends are then magnetically coupled to that leg of the respective coil core which is in the coil, e.g., to the leg 171, namely laterally instead of at the ends of the core legs, as can be seen.

This formation of ends magnetically coupled to the respective coil cores is also possible with return-path stampings extending on the outside surface of the measuring tube; this is not shown in a separate figure, since such ends can be formed by those skilled in the art in a manner analogous to FIG. 3.

Figure 4B:
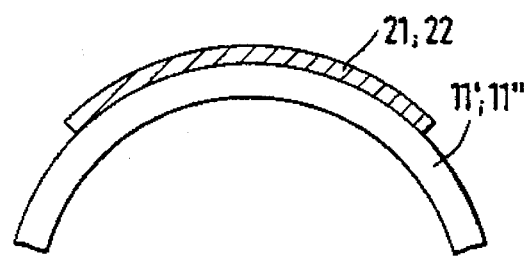

While FIG. 4, as already briefly mentioned above, shows the arrangement of the pole stampings 21, 22 on the outside surface of the metallic measuring tube 11 (FIG. 4a) and of the ceramic measuring tube 11' or plastic measuring tube 11" (FIG. 4b), FIG. 5 illustrates another possibility of implementing the pole pieces, namely their design as pole regions 31.

Figure 5B:
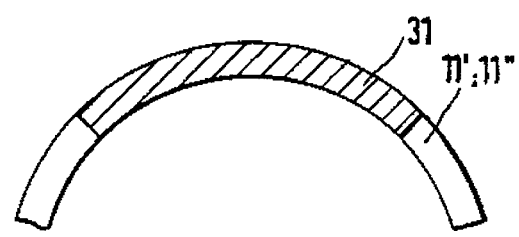

FIG. 5a shows the nonferromagnetic metallic measuring tube 11 with the pole region 31 put, e.g., welded or soldered, in its wall. In FIG. 5b, the pole region 31 is a magnetically conductive ceramic region in the case of a ceramic measuring tube 11' or a magnetically conductive plastic region in the case of a plastic measuring tube 11". These regions can be produced during the manufacture of the measuring tube by admixing suitable metal powders.

Figure 6B:
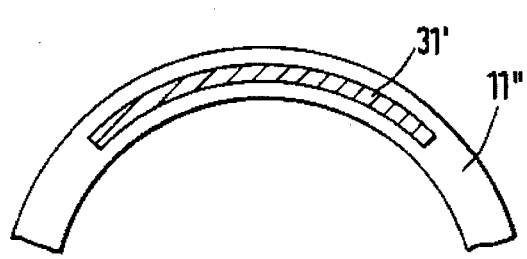

FIG. 6a shows the arrangement of a pole stamping on the inside surface of the metallic measuring tube 11, with the pole stamping and the metallic measuring tube 11 separated from the fluid by the insulation 9. FIG. 6b shows the corresponding case for a plastic measuring tube 11', where the pole stamping is embedded in the plastic.

The variants of the arrangement and the implementation of the pole stampings illustrated with the aid of FIGS. 4 to 6 are applicable analogously to the return-path stampings. For these, too, no separate illustrations are provided, since their arrangement can be readily implemented by those skilled in the art.

In all embodiments, a magnetic circuit of low reluctance from the pole stampings or regions through the coil cores to the return-path stampings or regions is present.

The pole stampings 21, 22, 31' and/or the return-path stampings 23, 24 can be implemented not only in the form of individual sheet stampings but also as sheet packets as are commonly used in transformers or electric motors. These sheet packets consist of a few, particularly ten, stacked laminations of soft magnetic material with a width chosen to obtain the low reluctance required, e.g., of grain-oriented sheet stampings whose surface is provided with a thin electrically insulating layer. The individual laminations of the sheet packet are thus electrically isolated from each other, whereby eddy-current losses are greatly reduced.

The magnetic field is generated by means of a conventional coil current generator circuit, for which the prior art circuits described in the extensive literature can be used.

The measuring electrodes 12 are connectable to conventional evaluation electronics (not shown) which convert the signal obtained from the measuring electrodes to a signal corresponding to the volumetric flow rate. For this, too, the prior art circuits described in the extensive literature can be employed.

The electromagnetic flow sensor is provided with an enclosure (not shown), particularly a metal casing, preferably a magnetically shielded casing, which surrounds the coils and/or the coil cores and/or the pole stampings or regions and/or the return-path stampings or regions. The enclosure may be filled with a filler, e.g., foam, if required.

I claim:

1. An electromagnetic flow sensor comprising
a nonferromagnetic metallic measuring tube through which flows an electrically conductive fluid to be measured and whose inside surface is lined with an insulating layer,
whose nominal diameter is 200 mm to 700 mm,
which has at least two measuring electrodes, and
at which means are provided for generating a magnetic field passing through the metallic measuring tube which comprise:
non-saddle-shaped coils disposed diametrically opposite to each other at the outside surface of the metallic measuring tube,
coil cores,
pole pieces of soft magnetic material which extend on both sides of the respective non-saddle-shaped coil in the circumferential direction and formed with ends separated by a distance,
two soft magnetic return-path regions each disposed on one side of the coils and of the pole pieces and completely extending around the measuring tube, said return-path stampings or regions being respectively magnetically coupled via the coil cores to the pole pieces, and
an enclosure surrounding at least one of the coils, the coil cores, the pole pieces and the return-path regions.

2. An electromagnetic flow sensor comprising
a measuring tube through which flows an electrically conductive fluid to be measured,
whose nominal diameter is 200 mm to 700 mm,
which has at least two measuring electrodes, and
at which means are provided for generating a magnetic field passing through the measuring tube which comprise:
non-saddle-shaped coils disposed diametrically opposite to each other at the outside surface of the measuring tube,
coil cores,
pole pieces of soft magnetic material which extend on both side of the respective coil in the circumferential direction and formed with ends separated by a distance,
two soft magnetic return-path regions each provided on one side of the coils and of the pole regions and forming a soft magnetic conductive section of the measuring tube,
said return-path regions being respectively magnetically coupled via the coil cores to the pole regions and completely surrounding the measuring tube, and
an enclosure surrounding at least one of the coils, the coil cores, the pole regions and the return-path regions.

3. An electromagnetic flow sensor comprising
a nonferromagnetic metallic measuring tube through which flows an electrically conductive fluid to be measured and whose inside surface is lined with an insulating layer,
whose nominal diameter is greater than 500 mm,
which has at least two measuring electrodes, and
at which means are provided for generating a magnetic field passing through the metallic measuring tube which comprise:
non-saddle-shaped pairs of coil sections disposed diametrically opposite to each other at the outside surface of the metallic measuring tube,
whose respective axes are in line and extend parallel to the axis of the metallic measuring tube,
one U-shaped coil core per coil section
which has the respective coil section wound on its portion interconnecting its legs,
pole pieces of soft magnetic material which extend on both sides of the respective pair of coil sections in the circumferential direction and formed with ends separated by a distance,
two soft magnetic return-path regions each disposed on one side of the coils and the pole regions and completely extending around the metallic measuring tube,
said return-path regions being respectively magnetically coupled via the coil cores to the pole regions such that
the respective core legs facing toward each other are magnetically coupled to the pole regions, and the respective core legs facing away from each other are magnetically coupled to the return-path regions, and
an enclosure surrounding at least one of the coils, the coil cores, the pole regions and the return-path regions.

4. An electromagnetic flow sensor comprising
a measuring tube through which flows an electrically conductive fluid to be measured,
whose nominal diameter is greater than 500 mm,
which has at least two measuring electrodes, and
at which means are provided for generating a magnetic field passing through the measuring tube which comprise:
non-saddle-shaped pairs of coil sections disposed diametrically opposite to each other at the outside surface of the measuring tube
whose respective axes are in line and extend parallel to the axis of the measuring tube,
one U-shaped coil core per coil section
which has the respective coil section wound on its portion interconnecting its legs,
pole pieces of soft magnetic material on both sides of the respective pair of coil sections in the circumferential direction and formed with ends separated by a distance,
two soft magnetic return-path regions completely surrounding the measuring tube and being respectively magnetically coupled via the coil cores to the pole regions such that the respective core legs facing toward each other are magnetically coupled to the pole regions, and the respective core legs facing away from each other to the return-path regions, and an enclosure surrounding at least one of the coils, the coil cores, the pole regions and the return-path regions.

5. An electromagnetic flow sensor as claimed in claim 1, comprising:

two coils whose respective axes are perpendicular to the axis of the measuring tube, and two U-shaped coil cores per coil whose leg length is little greater than the length of the coils, one leg of each of which extends into the respective coil and is magnetically coupled to the pole regions, with the legs in the respective coils separated by a given distance, and whose respective legs which are not in the respective coils are magnetically coupled to the return-path regions.

6. An electromagnetic flow sensor as claimed claim 3, wherein the two U-shaped coil cores belonging to a coil are united to form a single E-shaped coil core.

7. An electromagnetic flow sensor as claimed in claim 1, wherein the coil pole pieces are interrupted in the vicinity of the coils, and wherein the ends formed thereby are bent up and magnetically coupled to that leg of the respective coil core which is in the coil.

8. An electromagnetic flow sensor as claimed in claim 1, wherein the return-path regions are interrupted in the vicinity of the coils, and wherein the ends formed thereby are bent up and magnetically coupled to that leg of the respective coil core which is not in the coil.

9. An electromagnetic flow sensor as claimed in claim 1, wherein the enclosure is a metal casing.

10. An electromagnetic flow sensor as claimed in claim 2, comprising:

two coils whose respective axes are perpendicular to the axis of the measuring tube, and two U-shaped coil cores per coil whose leg length is little greater than the length of the coils, one leg of each of which extends into the respective coil and is magnetically coupled to the pole regions, with the legs in the respective coils separated by a given distance, and whose respective legs which are not in the respective coils are magnetically coupled to the return-path regions.

11. An electromagnetic flow sensor as claimed claim 4, wherein the two U-shaped coil cores belonging to a coil are united to form a single E-shaped coil core.

12. An electromagnetic flow sensor as claimed claim 5, wherein the two U-shaped coil cores belonging to a coil are united to form a single E-shaped coil core.

13. An electromagnetic flow sensor as claimed in claim 2, wherein the coil pole pieces are interrupted in the vicinity of the coils, and wherein the ends formed thereby are bent up and magnetically coupled to that leg of the respective coil core which is in the coil.

14. An electromagnetic flow sensor as claimed in claim 3, wherein the pole pieces are interrupted in the vicinity of the coils, and wherein the ends formed thereby are bent up and magnetically coupled to that leg of the respective coil core which is in the coil.

15. An electromagnetic flow sensor as claimed in claim 4, wherein the pole pieces are interrupted in the vicinity of the coils, and wherein the ends formed thereby are bent up and magnetically coupled to that leg of the respective coil core which is in the coil.

16. An electromagnetic flow sensor as claimed in claim 2, wherein the return-path regions are interrupted in the vicinity of the coils, and wherein the ends formed thereby are bent up and magnetically coupled to that leg of the respective coil core which is not in the coil.

17. An electromagnetic flow sensor as claimed in claim 3, wherein the return-path regions are interrupted in the vicinity of the coils, and wherein the ends formed thereby are bent up and magnetically coupled to that leg of the respective coil core which is not in the coil.

18. An electromagnetic flow sensor as claimed in claim 4, wherein the return-path regions are interrupted in the vicinity of the coils, and wherein the ends formed thereby are bent up and magnetically coupled to that leg of the respective coil core which is not in the coil.

19. An electromagnetic flow sensor as claimed in claim 2, wherein the enclosure is a metal casing.

20. An electromagnetic flow sensor as claimed in claim 3, wherein the enclosure is a metal casing.

21. An electromagnetic flow sensor as claimed in claim 4, wherein the enclosure is a metal casing.

* * * * *